United States Patent [19]
Norton

[11] Patent Number: 5,330,205
[45] Date of Patent: Jul. 19, 1994

[54] POWER CHUCK WITH QUICK CHANGE TOP JAW

[75] Inventor: Jerry Norton, Prairie Ronde Township, Kalamazoo County, Mich.

[73] Assignee: Buck Chuck Company, Kalamazoo, Mich.

[21] Appl. No.: 147,875

[22] Filed: Nov. 4, 1993

[51] Int. Cl.⁵ .......................................... B23B 31/16
[52] U.S. Cl. ...................................... 279/124; 279/152
[58] Field of Search ................ 279/123, 124, 152, 153; 269/259, 261, 262, 271, 280, 282–284

[56] References Cited

U.S. PATENT DOCUMENTS

| | | |
|---|---|---|
| 2,667,358 | 1/1954 | Highberg . |
| 3,219,356 | 11/1965 | Wilterdink et al. . |
| 3,679,221 | 7/1972 | Behrens . |
| 3,833,232 | 9/1974 | Behrens . |
| 3,868,120 | 2/1975 | Blättry et al. . |
| 4,352,500 | 10/1982 | Blättry et al. . |
| 4,569,530 | 2/1986 | Cross ................................... 279/123 |
| 4,667,971 | 5/1987 | Norton et al. .................. 279/123 X |

*Primary Examiner*—Steven C. Bishop
*Attorney, Agent, or Firm*—Flynn, Thiel, Boutell & Tanis

[57] ABSTRACT

A jaw carrier arrangement is provided with a main jaw carrier which removably mounts a top jaw. The jaw carrier has a bore opening outwardly through a front face for receiving a rear support post provided on the top jaw. A clamping structure is provided on the jaw carrier to securely and rigidly hold the top jaw in snug engagement with the front face. The clamping arrangement includes radially inner and outer clamping members having opposed riblike wedges which project inwardly toward the post for engagement within wedge-like grooves which are formed on diametrically opposite sides of the post and extend perpendicularly thereacross. The inner and outer clamping members are controlled by rotation of a threaded spindle which causes simultaneous movement of the clamping members in opposite directions, whereby the clamping members move inwardly so that the ribs engage the grooves on opposite sides of the post to securely clamp the post therebetween, and at the same time effect a snug drawing in of the post and of the top jaw against the front face of the chuck.

8 Claims, 3 Drawing Sheets

POWER CHUCK WITH QUICK CHANGE TOP JAW

FIELD OF THE INVENTION

This invention relates to a jaw-type chuck and, more specifically, to an improved mounting arrangement for facilitating fast changing of the top jaws and for permitting proper securement of the top jaws for use with both inside and outside diameter gripping.

BACKGROUND OF THE INVENTION

Conventional jaw chucks as associated with rotary machine tools, such as lathes, employ a rotatable chuck housing which mounts a plurality of radially displaceable jaw carriers, and these in turn removably mount jaws which are adapted for gripping a workpiece. The jaws assume many shapes and sizes, and are interchangeably mountable on the jaw carriers to facilitate use of the chuck in conjunction with a wide variety of workpieces. One conventional mounting technique for removably securing jaws to jaw carriers involves the use of threaded fasteners, specifically screws or bolts. Such arrangements, however, are time consuming when changing of the jaws is desired, increase the size, mass and complexity of the jaw arrangement, and often result in structures which reduce the rigidity of the jaw assembly but increase the undesired centrifugal force effect.

In an attempt to facilitate the mounting of jaws on carrier assemblies, several arrangements have been developed employing a carrier assembly having main and auxiliary carrier members which are relatively movable with respect to one another to facilitate the mounting or removal of the jaw. Most of these arrangements, however, have still possessed features which have resulted in structural and operational complexities.

One such arrangement is illustrated by U.S. Pat. No. 3,868,120 (Blattry et al). This patent illustrates a main jaw carrier having an auxiliary carrier slidably mounted thereon. In this arrangement, however, all of the opposed surfaces of the jaw carriers must be rigidly joined together to permit proper utilization of the arrangement, and hence this restricts the changing of the jaws.

Another arrangement is illustrated by U.S. Pat. No. 3,219,356 (Wilterdink et al) which discloses a rotary cam for locking the upper and lower jaw carrier portions together, although the joining of the carrier portions is through interfitting serrated surfaces. This type of arrangement increases the manufacturing cost and decreases the efficiency of the apparatus as regards its convenience of use.

Other arrangements of this general type are disclosed by U.S. Pat. Nos. 3,833,232, 2,667,358, 3,679,221 and 4,352,500. The arrangements of these latter patents involve complex structural and functional arrangements which hence minimize their desirability.

Still another arrangement is illustrated by U.S. Pat. No. 4,667,971 owned by the Assignee hereof. This '971 patent does illustrate therein a fast change top jaw system for a chuck which has proven highly desirable in terms of its ability to permit rapid changing of top jaws. This arrangement, however, wherein the master jaw and a spring-urged auxiliary jaw define a dovetail projection for cooperation with a dovetail groove in the top jaw, still possesses a greater number of parts and components than is ultimately desired. Further, and more significantly, this latter arrangement, while highly desirable for inside-diameter gripping, is less suitable for outside-diameter gripping because of the structural and functional arrangement of the fast-change locking structure.

Accordingly, this invention relates to an improved jaw carrier arrangement for permitting rapid and efficient removing and/or mounting of a top jaw, and particularly to an improved jaw carrier arrangement which is highly suitable for use with top jaws which engage either inside diameter or outside diameter surfaces of a workpiece while still providing for secure and rigid gripping of the workpiece in a efficient but dependable manner. This improved jaw carrier arrangement is also believed to possess an improved and more desirable structural and functional arrangement so as to facilitate both economical manufacture and efficient utilization thereof.

In the improved jaw carrier arrangement of this invention, there is provided a main jaw carrier which removably mounts thereon a top jaw. For this purpose the main jaw carrier has a bore therein which opens outwardly through the front face of the jaw carrier for receiving therein a rearwardly projecting support post provided on the top jaw. A clamping structure is provided on the main jaw carrier for creating a wedgelike clamping engagement with the post of the top jaw to securely and rigidly hold the top jaw in snug engagement with the front face of the chuck. The clamping arrangement includes radially inner and outer clamping members having opposed riblike wedges which project inwardly toward the post for engagement within wedgelike grooves which are formed on diametrically opposite sides of the post and extend perpendicularly across the post in generally parallel relationship to one another. The inner and outer clamping members are controlled by rotation of a threaded spindle which causes simultaneous movement of the clamping members in opposite directions, whereby the clamping members move inwardly so that the ribs thereon engage the grooves on opposite sides of the post to securely clamp the post therebetween, and at the same time effect a snug drawing in of the post and of the top jaw against the front face of the chuck. The clamping which occurs on opposite sides of the post, which opposite sides are disposed radially inwardly and outwardly relative to the chuck, provide a rigid securement of the top jaw so as to permit the top jaw to grippingly engage either an inside diameter or an outside diameter of a workpiece.

Other objects and purposes of the invention will be apparent to persons familiar with structures of this general type upon reading the following specification and inspecting the accompanying drawings.

Figure 1:
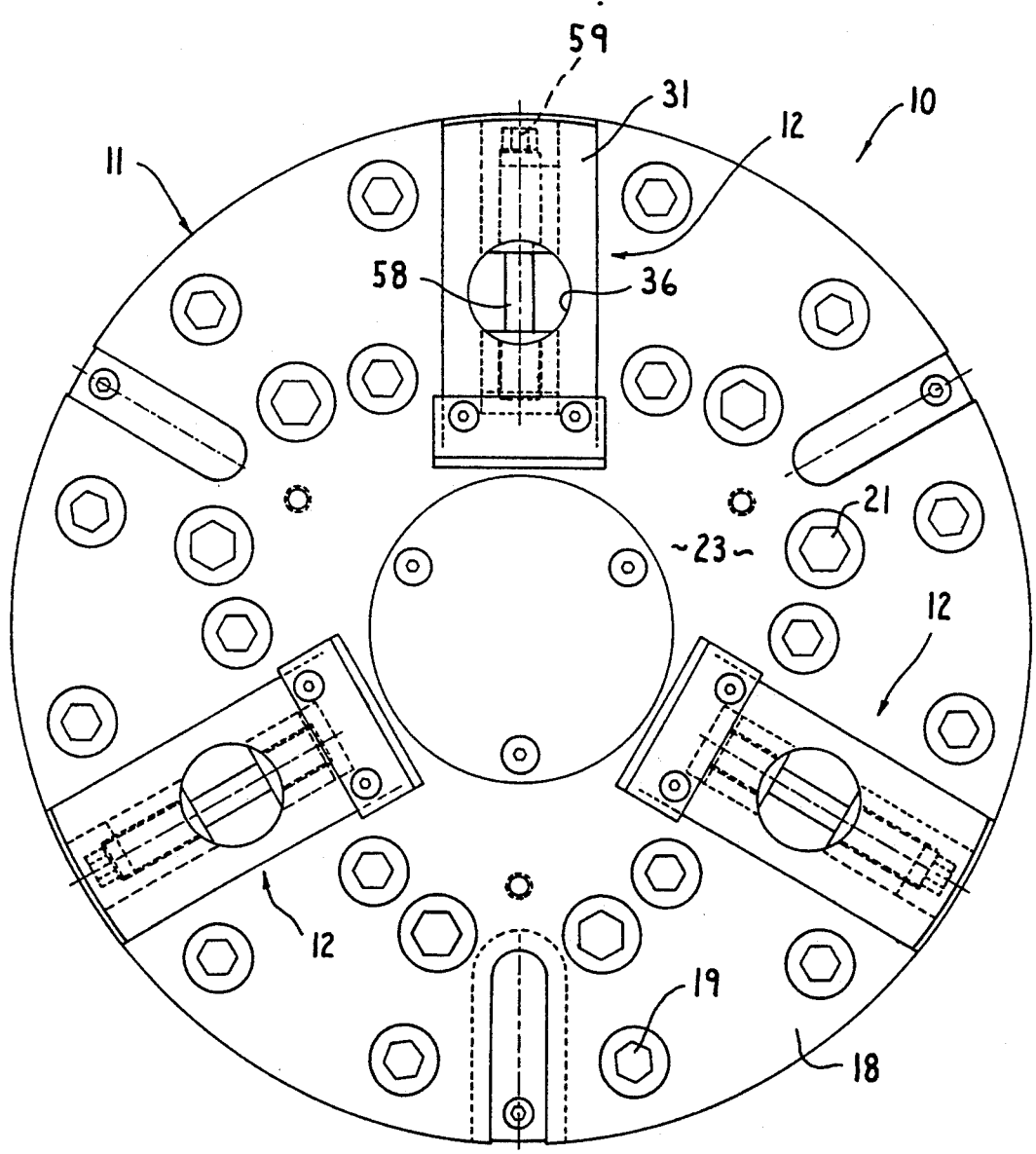
FIG. 1 is an elevational view illustrating the end or front face of the chuck, the top jaws being removed for purposes of illustration.

Certain terminology will be used in the following description for convenience in reference only, and will not be limiting. For example, the words "upwardly", "downwardly", "rightwardly" and "leftwardly" will refer to directions in the drawings to which reference is made. The word "front" will refer to the exposed face of the chuck, namely the rightward side thereof as appearing in FIG. 2. The words "inwardly" and "outwardly" will refer to directions toward and away from, respectively, the geometric center of the chuck and designated parts thereof. Said terminology will include the words specifically mentioned, derivatives thereof, and words of similar import.

DETAILED DESCRIPTION

Referring to the drawings, there is illustrated a chuck assembly 10 which includes a housing 11 having thereon a plurality, here three, of jaw carrier assemblies 12 disposed in uniformly angularly spaced relationship around the housing. Each carrier assembly 12 is adapted to have a jaw 13, normally referred to as a top jaw, removably mounted thereon. A conventional actuator or drawbar assembly 14 connects to the carrier assemblies 12 for controlling the radial movement thereof, and hence the positioning of the jaws 13 for engagement with a workpiece. The chuck assembly 10 having an overall configuration as described above is conventional and is adapted to be mounted on and rotatably supported adjacent the front face of a machine tool, such as a lathe, for supporting a workpiece which is to be machined.

The housing 11 includes a main annular housing part 15 which, in the illustrated embodiment, has an inner liner or sleeve 16 concentrically mounted therein, the latter defining a central bore 17 which projects through the housing part. An annular front plate 18 is fixed to the housing part 15, as by fasteners 19. The radially inner portion of this plate 18 radially overlaps the front end of the bore 17 and effectively defines a front stop for the drawbar assembly 14. A plurality of elongated fasteners 21 extend completely through the housing for permitting its attachment to a rotatable front plate associated with the spindle of the lathe.

Figure 3:
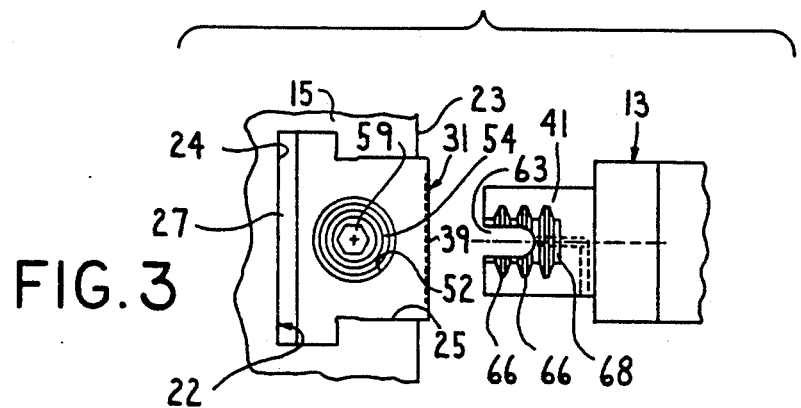
FIG. 3 is a fragmentary top view which illustrates the upper ends of the main and top jaws in the separated condition illustrated by FIG. 2.

The housing assembly 11 has a plurality of T-shaped slots 22 (FIG. 3) formed therein. These slots 22 project radially outwardly from the bore 17 through the outer periphery of the housing, and also open axially outwardly through the front face 23. These T-shaped slots 22, there being three such slots which mount therein carrier assemblies 12, project radially outwardly of the housing in uniformly angularly spaced relationship therearound. Each slot 22, when viewed in cross-section has an enlarged head portion 24 which is spaced axially rearwardly from the front plate 18. The head portion 24 is joined to a narrower stem portion 25 which projects axially through the front plate 18. The T-shaped slot 22 projects radially through the outer peripheral wall 26 of the housing, and is conventionally provided with a bushing or slide plate 27 fixed to the rear wall thereof to facilitate the free radial sliding movement of the respective carrier assembly.

The carrier assembly 12 includes a main jaw carrier 31 (often referred to as a master jaw) which is also T-shaped in cross-section and sized so as to be snugly but radially slidably disposed within a respective one of the T-shaped slots 22. The main jaw carrier 31 has the leg or stem portion thereof projecting outwardly of the slot past the front face of the front plate 18 for releasable engagement with the top jaw 13, as explained hereinafter.

A wedge or cam portion 32 is fixedly, here integrally, formed on the radially inner end of the main jaw carrier 31. Wedge portion 32 projects into the bore 17 and is slidably engaged within a wedge-shaped groove formed on a piston 33 associated with the drawbar assembly 14. This piston 33 is axially slidably supported within the bore 17 and has a bar 34 fixed thereto and projecting rearwardly therefrom, the latter being connected to the standard axially movable drawbar as associated with a lathe. The connection of the main jaw carriers to the drawbar assembly by means of wedgelike cams, whereby the jaw carriers are moved radially in response to axial movement of the drawbar assembly, is conventional and well known, and one typical construction of such arrangement is illustrated by U.S. Pat. No. 3,424,467.

Jaw carrier 31 also has a generally cylindrical bore 38 extending therethrough, which bore opens inwardly from the front face 39 of the jaw carrier and is disposed with its axis 37 extending generally parallel with the main axis 29 of the chuck. This bore 38 is sized so as to snugly accommodate therein a generally cylindrical support post or projection 41 which is fixedly secured to and projects perpendicularly rearwardly away from the rear face 42 of the top jaw 13. The post 41 can be axially slidably inserted into or removed from the bore 38 of the main jaw 31 when mounting or removal of the top jaw is desired.

The main jaw 31 and the top jaw 13 also have a key structure which cooperates therebetween when the jaws are engaged together for ensuring proper alignment of the top jaw. This key structure, in the illustrated embodiment, includes a key 43 which is fixed to and projects outwardly from the front face 39 of the main jaw 31, and a groove 44 formed in the rear face of the top jaw 13 for snugly accommodating the key 43 therein when the top jaw is properly mounted on the main jaw.

The top jaw 13 is also provided with a gripper 45 thereon which, in this illustrated embodiment, is positioned and configured for gripping an inside diameter of a workpiece. However, the present invention is equally suitable for use with a top jaw which is designed to cooperate with an outside diameter of a workpiece, such top jaw being diagrammatically illustrated by dotted lines in FIG. 2.

To provide for a fixed and rigid but releasable securement of the top jaw 13 to the main jaw 31, each main jaw 31 mounts thereon a clamping or holding device 51 for secure and rigid engagement with the post 41 when the top jaw is mounted on the main jaw. This clamping device 51 is disposed within a cylindrical bore 52 which is formed in and extends longitudinally through the main jaw 31, which bore 52 in the illustrated embodiment projects generally radially outwardly from and in generally intersecting relationship to the main chuck axis 29. This cylindrical bore 52 opens radially outwardly through the outer peripheral surface 26 of the chuck housing, and in fact the bore defines an access opening 53 where it communicates with the housing peripheral surface.

The clamping device 51 includes outer and inner clamps 54 and 55, respectively, each of which is constructed as a cylindrical sleevelike member supported for slidable movement longitudinally (i.e. axially) within the bore 52. Each of the clamps 54 and 55 is maintained nonrotatable relative to the main jaw 31 by means of a key 56 which is secured to the main jaw and projects into an elongate slot 57 which is formed in and extends axially of the respective clamp. This key and slot arrangement 56–57 enables the clamps 54 and 55 to move axially of the bore 52 while preventing rotation of the clamps.

The clamping device 51 also includes an elongate rotatable spindle 58 which extends coaxially along the bore 52. This spindle 58 has outer and inner threaded parts 61 and 62, respectively, fixedly associated therewith adjacent the respective radially outer and inner ends thereof. The outer threaded part 61 projects coaxially through and is threadably engaged with the outer clamp 54, and similarly the inner threaded part 62 projects coaxially through and is threadably engaged with the inner clamp 55. These thread parts 61 and 62, as well as the interior threaded openings of the clamps 54 and 55, are reversely threaded so that the threaded parts 61–62 effectively define a differential screw. Rotation of the screw or spindle 58 in one rotational direction causes the clamps 54–55 to be simultaneously radially displaced toward one another along the bore 52, whereas rotation of the spindle 58 in the opposite rotational direction causes simultaneous radial displacement of the clamps 54 and 55 away from one another along the axis of the bore 52.

The spindle 58, at the radially outer end thereof, is provided with a drive portion 59 which, in the illustrated embodiment, is formed substantially as a hexagonal bolt head so as to permit engagement with a conventional wrench which can be used for effecting rotational driving of the spindle 58 in the selected direction.

Figure 2:
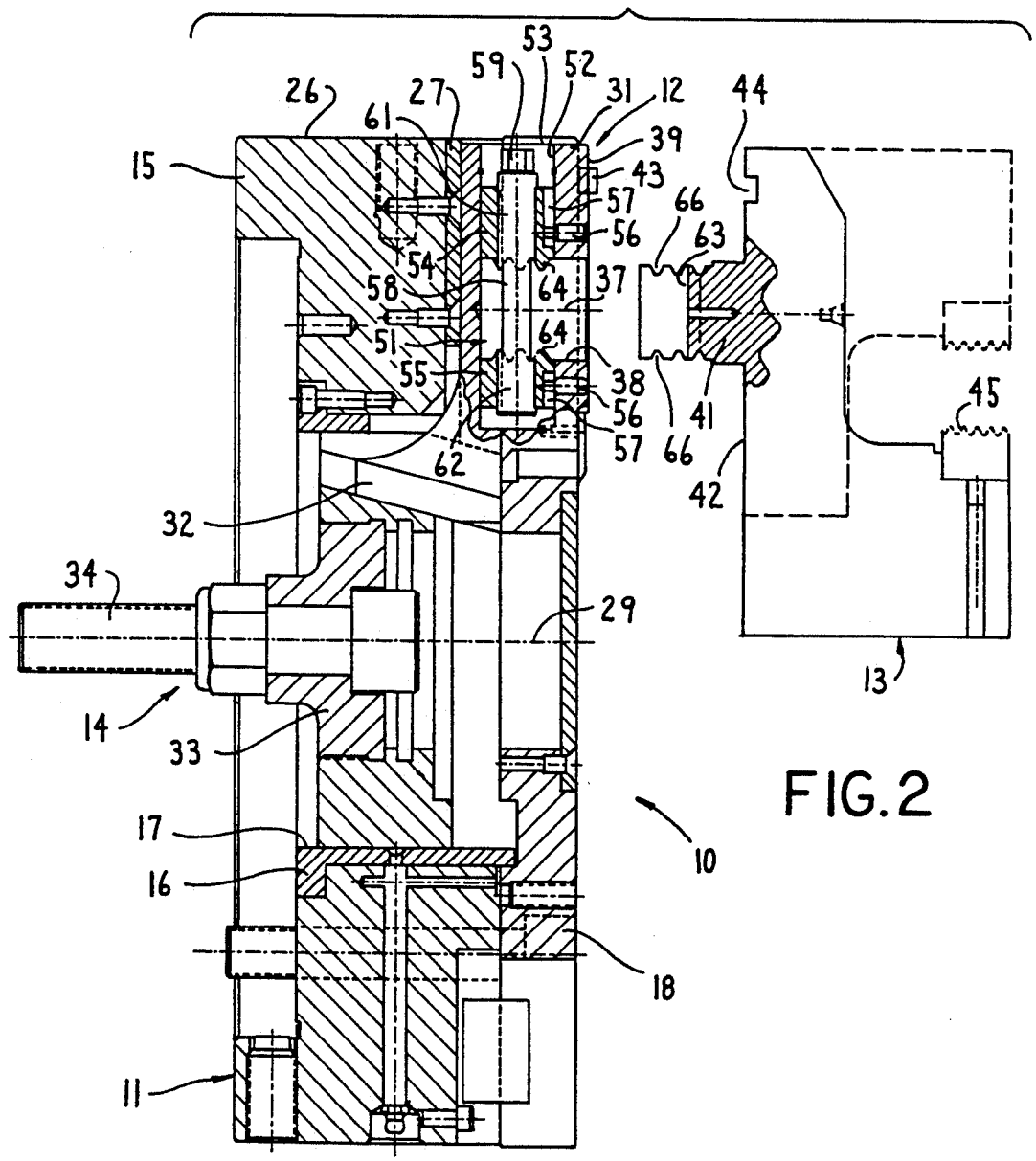
FIG. 2 is a central sectional view through the chuck as appearing in FIG. 1, and illustrating the top jaw adjacent but separated from the respective main jaw.
Figure 4:
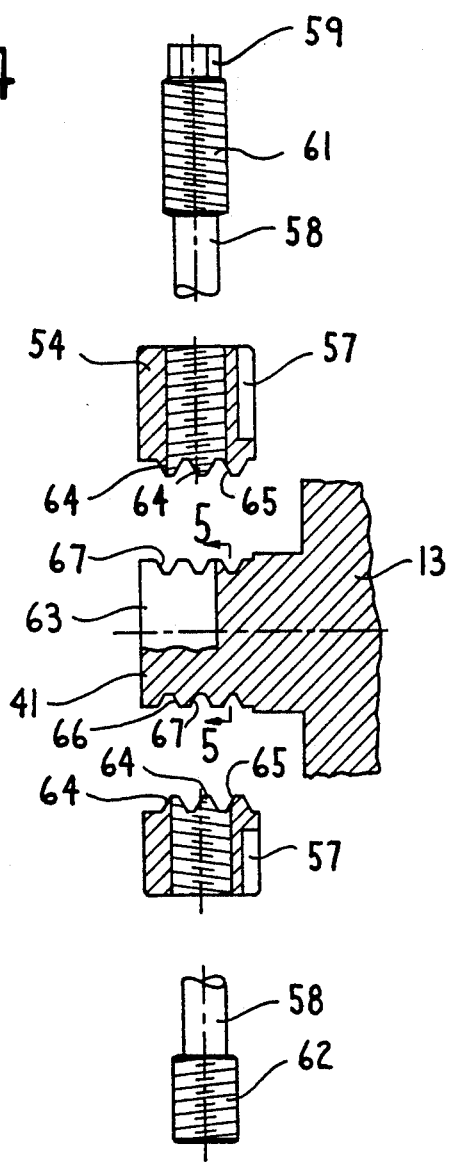
FIG. 4 is an exploded view, partially in cross-section, of the components which make up the clamping arrangement and its cooperation with the post on the top jaw.
Figure 5:
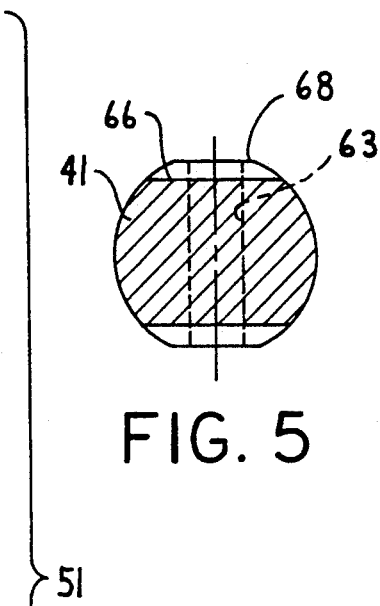
FIG. 5 is a sectional view taken substantially along line 5—5 in FIG. 4.

As illustrated by FIG. 2, the outer and inner clamps 54–55 are normally disposed radially adjacent opposite ends of the bore 52 so as to be disposed generally adjacent opposite sides of the traverse-extending bore 38, whereupon the central nonthreaded portion of the rod 58 extends perpendicularly across the bore 38. To accommodate this rod 58, the cylindrical post 41 has a slot 63 extending diametrically thereacross, with this slot 63 projecting axially inwardly from the free end of the post through a selected distance. The slot 63 has a width which slightly exceeds the diameter of the spindle 58 to accommodate passage of the spindle through the slot.

The clamping device 51 also includes an interengaging wedge structure cooperating between the post 41 and the clamps 54–55 for creating a rigid securement therebetween. The wedge structure includes a plurality of ribs or teeth 64 formed on the opposed axial ends of each of the clamps 54–55, which ribs 64 extend perpendicularly across the respective end face of the clamp 54–55 in generally perpendicular relationship to the axis 37 of the cylindrical bore 38. These ribs project axially outwardly toward the opposed end face of the opposite clamp, and are adapted to cooperate with a plurality of transversely extending grooves or slots 66 as formed in the adjacent peripheral surface portion of the post 41. In this respect, the post 41 is preferably provide with shallow flats 68 on diametrically opposite sides thereof, which flats extend in parallel relationship, and the plurality of grooves or slots 66 are formed inwardly from these flats so that the plurality of grooves extend in parallel relationship to one another, with the grooves extending across the flats so as to extend in a direction which is perpendicular relative to the axis of the cylindrical post 41. In view of the straight configuration of these grooves 66 and their formation within the generally cylindrical profile of the post 41, the grooves are of maximum depth at the middle thereof, with the grooves being of decreasing depth as they project outwardly toward opposite ends where the bottoms of the grooves merge with the peripheral surface of the post.

The ribs or teeth 64 are provided with sloped wedgelike rear surfaces 65 thereon, and the grooves 66 are similarly provided with slope wedgelike rear surfaces 67, the latter being adapted to slidably engaged with the wedgelike rear surfaces 65 on the ribs. In the illustrated embodiment, each clamp 54–55 has a plurality of ribs or teeth 64, three in the illustrated embodiment, and the diametrically opposite sides of the post 41 are provided with similar and corresponding sets of three grooves 66.

Due to the straight configuration of both the grooves 66 and teeth 64, this increases the contact area between the teeth and grooves when the clamps are moved into clamping engagement with opposite sides of the post, such as illustrated by FIG. 2. Not only does this increase the linear contact area lengthwise along each groove, but the plurality of such grooves also increases the contact area over several generally parallel or transversely located planes. Hence, the contact between the three teeth and the corresponding three grooves thus effectively results in a contact area which is spread over a larger area relative to a plane extending axially along the cylindrical support post 41, thereby increasing the strength and rigidity of the connection between the clamps 54–55 and the cylindrical post 41. Further, since this rigidity is achieved on diametrically opposite sides of the post due to the diametral gripping on opposite sides of the post by the opposed clamps 54–55, this provides strength and rigidly irrespective of whether the top jaws are providing for inside diameter or outside diameter gripping.

In operation, assuming that the clamps 54–55 are slightly retracted and the cylindrical bore 38 is free of a top jaw, then the top jaw 13 is positioned so that the post 41 is aligned with the opening 38. The top jaw is moved rearwardly so as to slidably insert the post 41 into the opening 38, which rearward movement occurs until the rear face 42 of the top jaw substantially abuts the front face 39 of the main jaw 31. In this position, and during the initial positioning of the top jaw, the top jaw is positioned so that the key 43 projects into the groove 44.

Thereafter the spindle 58 is rotated by applying a wrench to the head 59, thereby causing the clamps 54–55 to be threadably moved inwardly toward one another so that the teeth 64 are inserted into the grooves 66 formed in the post 41. The rotation of the spindle 58 and the threaded engagement thereof with the clamps 54–55 provides a high mechanical advantage which enables the teeth 64 to be wedged snugly into the grooves 66 to effect secure clamping of the post 41 between the clamps 54–55. At the same time, the cooperation between the rear wedgelike surfaces 65 and 67 exerts an axial rearward pushing force against the post 41 which tends to draw the post 41 inwardly into the bore 38 to cause the rear face 42 of the top jaw to be snugly held against the front face 39 of the main jaw 31. When this snug and rigid relationship has been achieved, the top jaw is then safely and securely held to the respective main jaw due to the self-locking of the threaded clamps 54–55 to the spindle 58. This relationship is maintained until the spindle 58 is reversely rotated so as to permit release of the clamps 54–55 from the cylindrical support post 41 and removal of the top jaw.

While the chuck as described above utilizes a drawbar piston 33 having wedges which couple to the main jaw carriers 31 for controlling movement of the latter, it will be recognized that numerous other conventional mechanisms can be provided for controlling the radial movement of the jaw carriers.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a chuck construction having a housing rotatable about an axis, and a plurality of jaw carriers mounted on the housing for movement radially thereof, each jaw carrier being adapted to have a top jaw mounted thereon adjacent a front face of the housing, and releasable locking means associated with each jaw carrier for permitting secure mounting and quick changing of the top jaw relative to the respective jaw carrier, the improvement wherein said releasable locking means comprises:

a bore formed in said jaw carrier in generally parallel relationship to said axis, said bore opening inwardly from a front face of the jaw carrier;

a post fixed to and projecting rearwardly from a rear face of the top jaw for slidable insertion into said bore for permitting the rear face of the top jaw to be positioned directly adjacent the front face of the jaw carrier;

releasable locking means cooperating between said jaw carrier and said post for permitting secure and rigid mounting but quick changing of the top jaw relative to the jaw carrier; and said locking means including opening means formed interiorly of said jaw carrier and extending in generally intersecting relationship with said bore, said opening means extending generally radially and including inner and outer portions which are disposed respectively on radially inner and radially outer sides of said bore, outer and inner clamp members slidably disposed respectively within the outer and inner portions of said opening means, threaded spindle means extending between and being threadedly connected to said inner and outer clamp members for causing movement of said inner and outer clamp members in opposite directions relative to one another in response to rotation of said spindle means, and rib-and-groove wedge means formed on and cooperating between said inner and outer clamp members and diametrically opposite sides of said post for creating a rigid but releasable clamping engagement on diametrically opposite sides of said post at locations which are disposed on radially opposite sides of said post relative to said axis for rigidly securing said post to the respective jaw carrier.

2. A chuck according to claim 1, wherein the wedge means includes a plurality of parallel and straight grooves formed in said post on diametrically opposite sides thereof so that said grooves extend substantially perpendicularly relative to said axis, said wedge means also including a plurality of generally straight and parallel ribs formed on an end face of the respective clamp member with said ribs also being elongated in substantially perpendicular relationship to said axis, said ribs being formed on opposed end faces of the inner and outer clamp members for respective engagement with the grooves formed on the radially inner and outer sides of the post when the post is positioned within said bore.

3. A chuck according to claim 2, wherein the ribs and grooves define cooperating wedgelike rear surfaces which tend to draw the post inwardly into the bore when the ribs are inserted downwardly into the grooves to cause the rear face of the top jaw to substantially abut the front face of the jaw carrier.

4. A chuck according to claim 2, wherein the post has a slot which opens inwardly from a free end thereof, said slot extending diametrically across said post for accommodating the spindle means as it extends intersectingly across said bore.

5. A chuck according to claim 2, wherein said opening means has a radially outer end thereof which opens outwardly through an external peripheral surface of said jaw carrier and said housing, said spindle means having a tool-engaging part secured thereto adjacent a radially outer end thereof for engagement with a tool to permit selected rotation of the spindle means.

6. A chuck according to claim 5, wherein the spindle means includes radially inner and outer threaded portions which are reversely threaded and are respectively threadably engaged with the inner and outer clamp members.

7. A chuck according to claim 6, wherein the ribs and grooves define cooperating wedgelike rear surfaces which tend to draw the post inwardly into the bore when the ribs are inserted downwardly into the grooves to cause the rear face of the top jaw to substantially abut the front face of the jaw carrier.

8. A chuck according to claim 7, wherein the post has a slot which opens inwardly from a free end thereof, said slot extending diametrically across said post for accommodating the spindle means as it extends intersectingly across said bore.

* * * * *